(12) United States Patent
Tsai et al.

(10) Patent No.: US 7,611,295 B2
(45) Date of Patent: Nov. 3, 2009

(54) ELECTRIC DUST-PROOF DEVICE

(75) Inventors: Yao-Ching Tsai, Taichung (TW);
Jung-Chun Yen, Taichung (TW);
Chien-Lung Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 379 days.

(21) Appl. No.: 11/796,535

(22) Filed: Apr. 26, 2007

(65) Prior Publication Data

US 2007/0264001 A1 Nov. 15, 2007

(30) Foreign Application Priority Data

May 11, 2006 (TW) .............................. 95116697 A

(51) Int. Cl.
*G03B 17/00* (2006.01)
*G03B 9/10* (2006.01)
*G02B 23/16* (2006.01)

(52) U.S. Cl. ...................... 396/448; 396/473; 396/493; 359/511

(58) Field of Classification Search .................. 396/355, 396/359, 448, 473, 477, 493, 495; 359/511
See application file for complete search history.

(56) References Cited

U.S. PATENT DOCUMENTS

| | | | | |
|---|---|---|---|---|
| 5,461,441 A | * | 10/1995 | Kotani | 396/349 |
| 5,617,167 A | * | 4/1997 | Kaji | 396/448 |
| 5,625,852 A | * | 4/1997 | Wada et al. | 396/349 |
| 6,212,335 B1 | * | 4/2001 | Inazuka | 396/85 |
| 6,334,718 B1 | * | 1/2002 | Akiba et al. | 396/448 |

* cited by examiner

*Primary Examiner*—W B Perkey
*Assistant Examiner*—Dennis Hancock
(74) *Attorney, Agent, or Firm*—David N. Lathrop

(57) ABSTRACT

An electric dust-proof device includes a driving mechanism disposed on a base seat unit, and a dust-proof plate driven by the drive mechanism. The driving mechanism includes a power unit, a drive unit driven by the power unit, a driving seat driven by the drive unit, and a driven seat driven by the driving seat. The dust-proof plate is driven by the driven seat to move between an open position and a close position.

14 Claims, 7 Drawing Sheets

ELECTRIC DUST-PROOF DEVICE

CROSS-REFERENCE TO RELATED APPLICATION

This application claims priority of Taiwanese Application No. 095116697, filed on May 11, 2006.

BACKGROUND OF THE INVENTION

1. Field of the Invention

This invention relates to a motor-driven device, and more particularly to an electric dust-proof device for use with a camera, a photographing camera, a projector, or other image formation apparatus to protect a lens from dust.

2. Description of the Related Art

Referring to FIGS. 1 and 2, an electric dust-proof device 1 disclosed in U.S. Pat. No. 5,461,441 is disposed in a housing 10 of a camera for protecting a lens 100 of the camera, and includes a dust-proof plate 11 for selectively covering the lens 100, and a driving unit 12 for driving the dust-proof plate 11 to move between an open position and a close position.

The driving unit 12 includes a motor 120, a driving gear 121 driven by the motor 120 to rotate in two directions, and a gearing consisting of a first gear 122, a second gear 123, a third gear 124, a fourth gear 125, a fifth gear 126, a rack gear 127, and a sixth gear 128. Each adjacent pair of the gears 121, 122, 123, 124, 125, 126, 127, 128 of the gearing meshes with each other. The first, second, third, fourth, fifth, and sixth gears 122, 123, 124, 125, 126, 128 are configured as spur gears.

To rotate the dust-proof plate 11 relative to the lens 100, the motor 120 is operated to rotate the driving gear 121. Rotation of the driving gear 121 is transferred to the first gear 122 by a plurality of interconnected gears (not shown), thereby rotating the second, third, fourth, fifth, and sixth gears 123, 124, 125, 126, 128 and moving the rack gear 127. Hence, the dust-proof plate 11 is rotated between the open position and the close position at a speed slower than that of the driving gear 121.

Although power can be transmitted from the motor 120 to the dust-proof plate 11, a large number of spur gears 122, 123, 124, 125, 126, 128 are disposed therebetween for the purpose of speed reduction, thus increasing the manufacturing costs of the electric dust-proof device 1 and the space occupied thereby and resulting in difficulties during assembly thereof.

SUMMARY OF THE INVENTION

The object of this invention is to provide an electric dust-proof device that can overcome the aforesaid disadvantages associated with the prior art.

Accordingly, an electric dust-proof device of this invention includes a base seat unit, a driving mechanism disposed on the base seat unit, and a dust-proof plate driven by the driving mechanism.

The driving mechanism includes a power unit, a drive unit, a driving seat, and a driven seat.

The power unit includes a motor disposed on the base seat unit, and a worm driven by the motor to rotate in two directions.

The drive unit includes a worm gear disposed rotatably on the base seat unit and meshing with the worm, and a first gear driven by the worm gear.

The driving seat includes a seat body disposed pivotally on the base seat unit, and a second gear disposed on the seat body and meshing with the first gear, and a pair of spaced-apart first and second pushing portions disposed on the driving seat body.

The driven seat includes a base body spaced apart from the seat body of the driving seat, an output member disposed on the base body, and a pair of spaced-apart first and second pushed portions disposed on said base body and corresponding respectively to the first and second pushing portions of the driving seat.

The dust-proof plate includes a connecting portion connected to the output member of the driven seat, and a covering plate portion extending from the connecting portion and co-movable with the connecting portion between an open position and a close position.

As such, power can be transmitted from the power unit to the dust-proof plate through the drive unit, the driving seat, and the driven seat so as to rotate the dust-proof plate between the open position and the close position.

Since the number of the components of the electric dust-proof device and, thus, the space occupied by the electric dust-proof device are reduced, the electric dust-proof device can be assembled with ease and manufactured at a lower cost.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
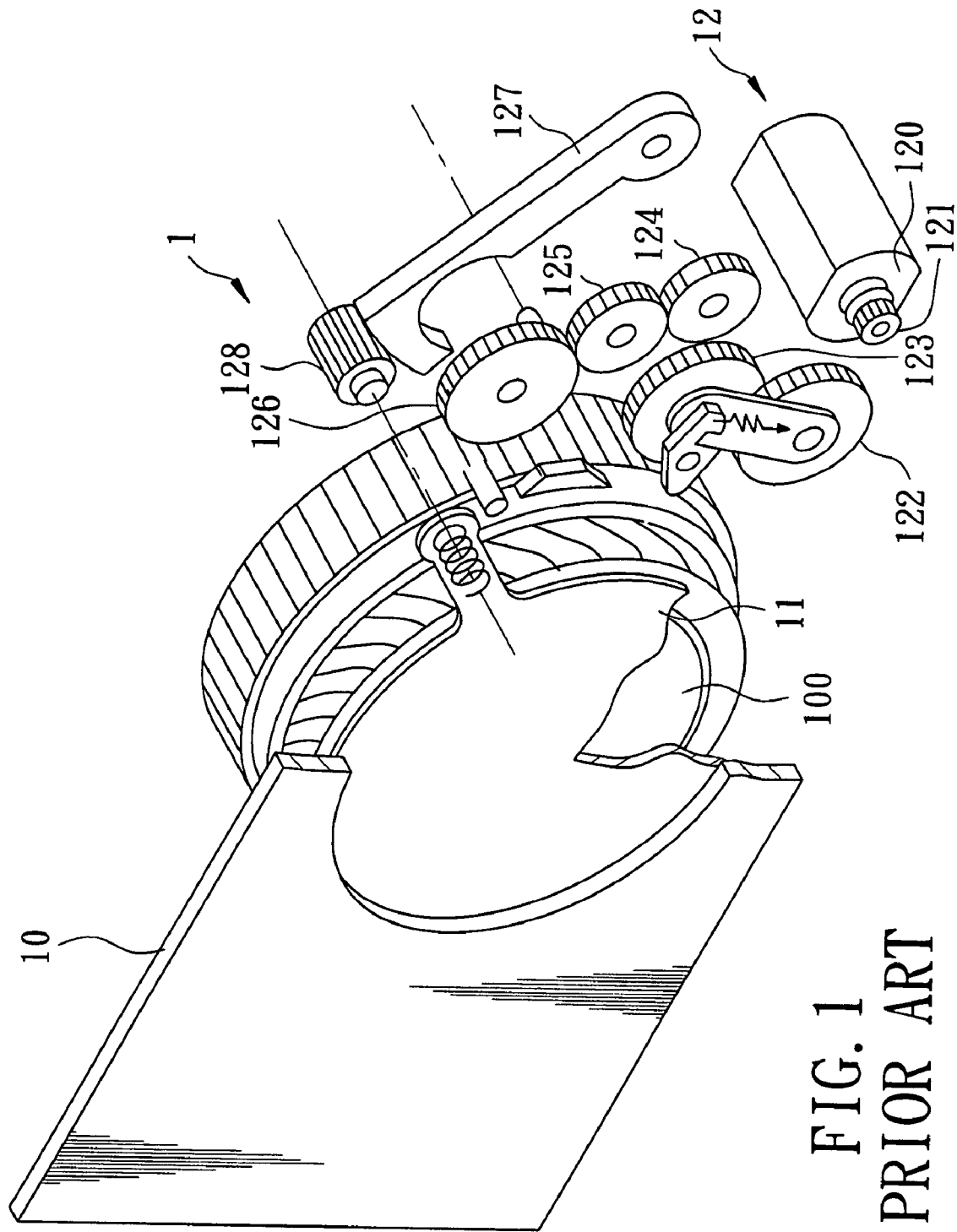
FIG. 1 is a perspective view of a conventional electric dust-proof device disclosed in U.S. Pat. No. 5,461,441.
Figure 2:
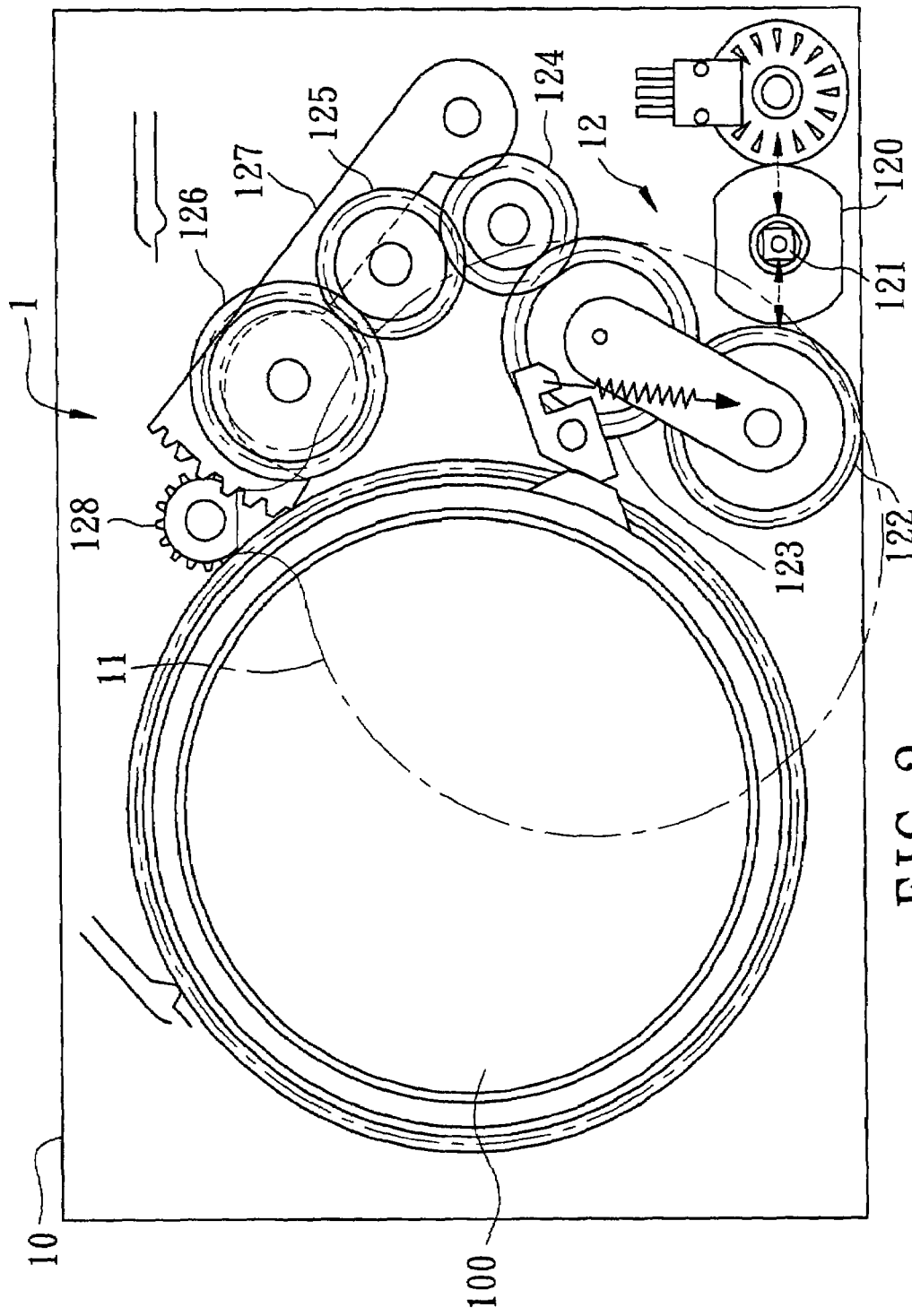
FIG. 2 is a side view of the conventional electric dust-proof device, illustrating a dust-proof plate in a partially open position.
Figure 3:
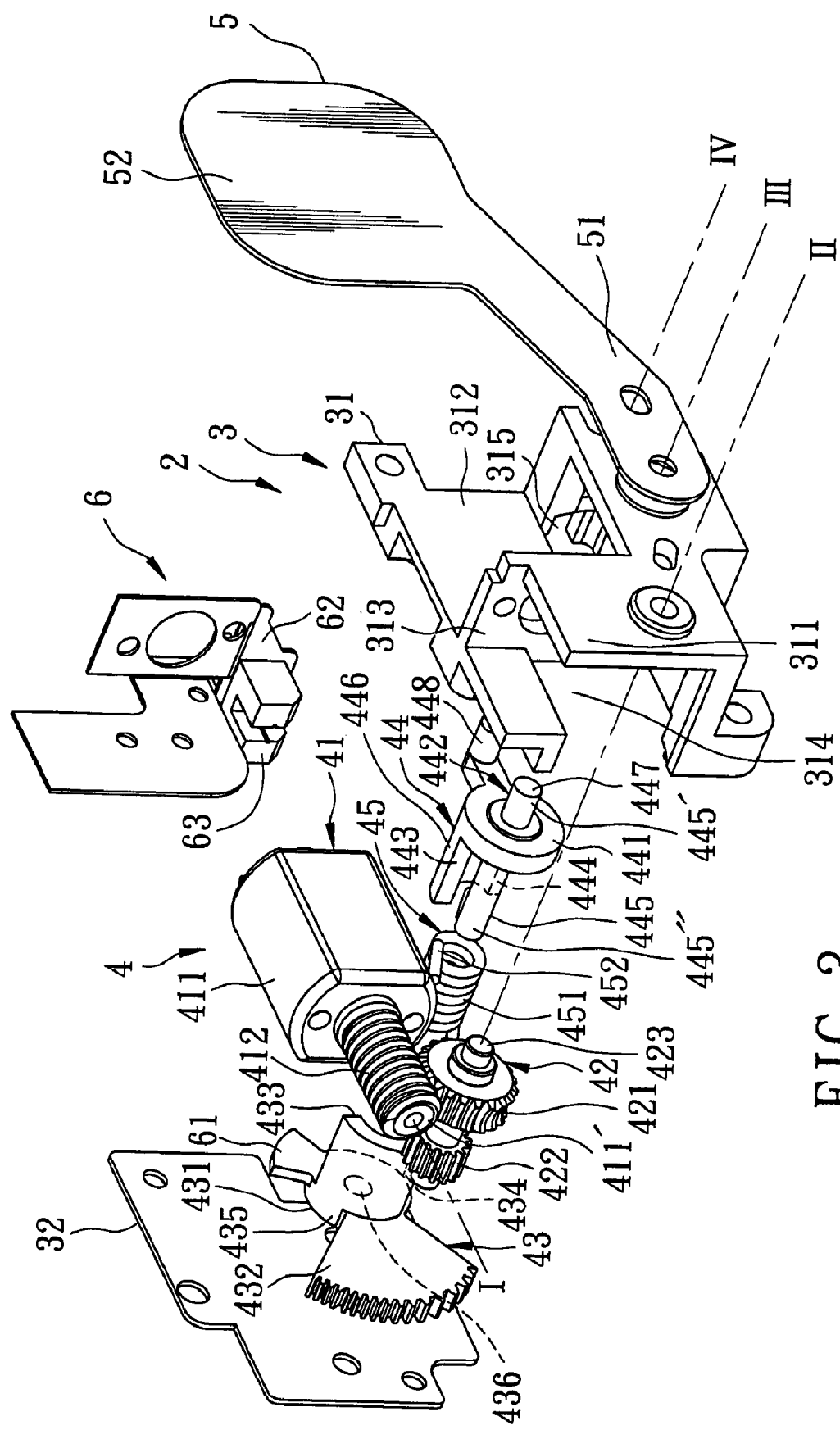
FIG. 3 is an exploded perspective view of the preferred embodiment of an electric dust-proof device according to this invention.
Figure 4:
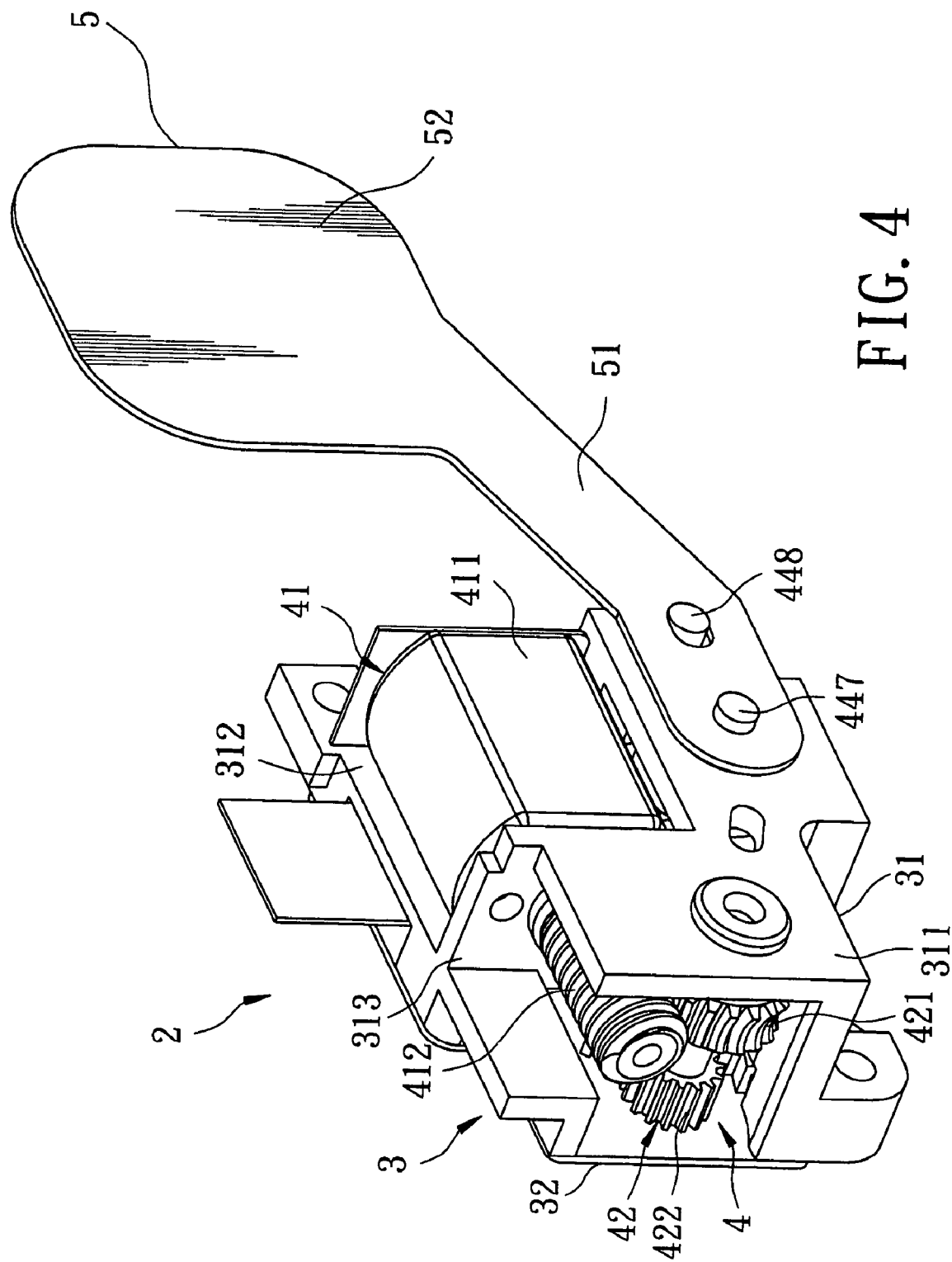
FIG. 4 is an assembled perspective view of the preferred embodiment.

Referring to FIGS. 3 and 4, the preferred embodiment of an electric dust-proof device 2 according to this invention includes a base seat unit 3, a driving mechanism 4 disposed on the base seat unit 3, a dust-proof plate 5 driven by the driving mechanism 4, and a position-sensing unit 6 for controlling the driving mechanism 4.

The base seat unit 3 includes a main seat body 31 and a cover plate 32. The main seat body 31 has a pair of front and rear walls 311, 312 parallel to and spaced apart from each other, and a middle partition 313. The middle partition 313 interconnects middle portions of the front and rear walls 311, 312 so as to define a first accommodating chamber 314 and a second accommodating chamber 315. The cover plate 32 covers the rear wall 312.

The driving mechanism 4 includes a power unit 41, a drive unit 42 driven by the power unit 41, a driving seat 43 driven by the drive unit 42, a driven seat 44 driven by the driving seat 43, and a deformable overloading protecting member 45 disposed between the driving seat 43 and the driven seat 44.

The power unit 41 includes a motor 411 disposed on the base seat unit 3, and a worm 412 driven by the motor 411.

The motor 411 includes an output shaft 411' extending through the middle partition 313 along a first axis (I) and on which the worm 412 is sleeved fixedly. The worm 412 and the motor 411 are disposed respectively within the first and second accommodating chambers 314, 315.

The drive unit 42 is disposed in the first accommodating chamber 314 in the main seat body 31 of the base seat unit 3, and includes a worm gear 421 meshing with the worm 412, a first gear 422 driven by the worm gear 421, and a pivot shaft 423 having two ends disposed respectively and rotatably on the front wall 311 of the main seat body 31 and the cover plate 32. The worm gear 421 and the first gear 422 are sleeved fixedly on the pivot shaft 423, and are rotatable about a second axis (II) perpendicular to the first axis (I).

The driving seat 43 includes a driving seat body 431 parallel to the front and rear walls 311, 312 of the main seat body 31, a second gear 432 disposed on the driving seat body 431 and meshing with the first gear 422, and a pair of spaced-apart first and second pushing portions 433, 434 disposed on the driving seat body 431.

The driving seat body 431 is disposed in the second accommodating chamber 315 in the base seat unit 3, and is rotatable about a third axis (III) parallel to the second axis (II). The second gear 432 is configured as a sector gear extending radially and outwardly from the driving seat body 431 into the first accommodating chamber 314, and meshes with the first gear 422 of the drive unit 42. The driving seat 43 further includes a first curved wall 435 projecting from a periphery of the driving seat body 431 toward the front wall 311 and extending in a circumferential direction of the third axis (III). The first and second pushing portions 433, 434 are configured respectively as two opposite circumferential end surfaces of the first curved wall 435.

The driven seat 44 is disposed pivotally on the base seat unit 3, and is coaxial with the driving seat 43. the driven seat 44 includes a base body 441 parallel to and spaced apart from the driving seat body 431, an output member 442 disposed on the base body 441, and a pair of spaced-apart first and second pushed portions 443, 444 disposed on the base body 441 and corresponding respectively to the first and second pushing portions 433, 434.

The base body 441 is rotatable about the third axis (III), and is disposed in the second accommodating chamber 315 in the base seat unit 3. The driven seat 44 further includes a pivot rod unit 445 and a second curved wall 446. The pivot rod unit 445 has front and rear rod portions 445', 445" extending respectively from front and rear side surfaces of the base body 411 and disposed respectively and rotatably on the front wall 311 and the cover plate 32. The front rod portion 445' ends within the front wall 311. The second curved wall 446 extends from a periphery of the base body 441 toward the rear wall 312, and extends in the circumferential direction of the third axis (III). The first and second pushed portions 443, 444 are configured respectively as two opposite circumferential end surfaces of the second curved wall 446. The driving seat body 431 of the driving seat 43 is formed with a pivot hole 436 permitting rotation of the rear rod portion 445" of the pivot rod unit 445 therein. The driving seat 43 and the driven seat 44 are rotatable about the pivot rod unit 445.

Figure 5:
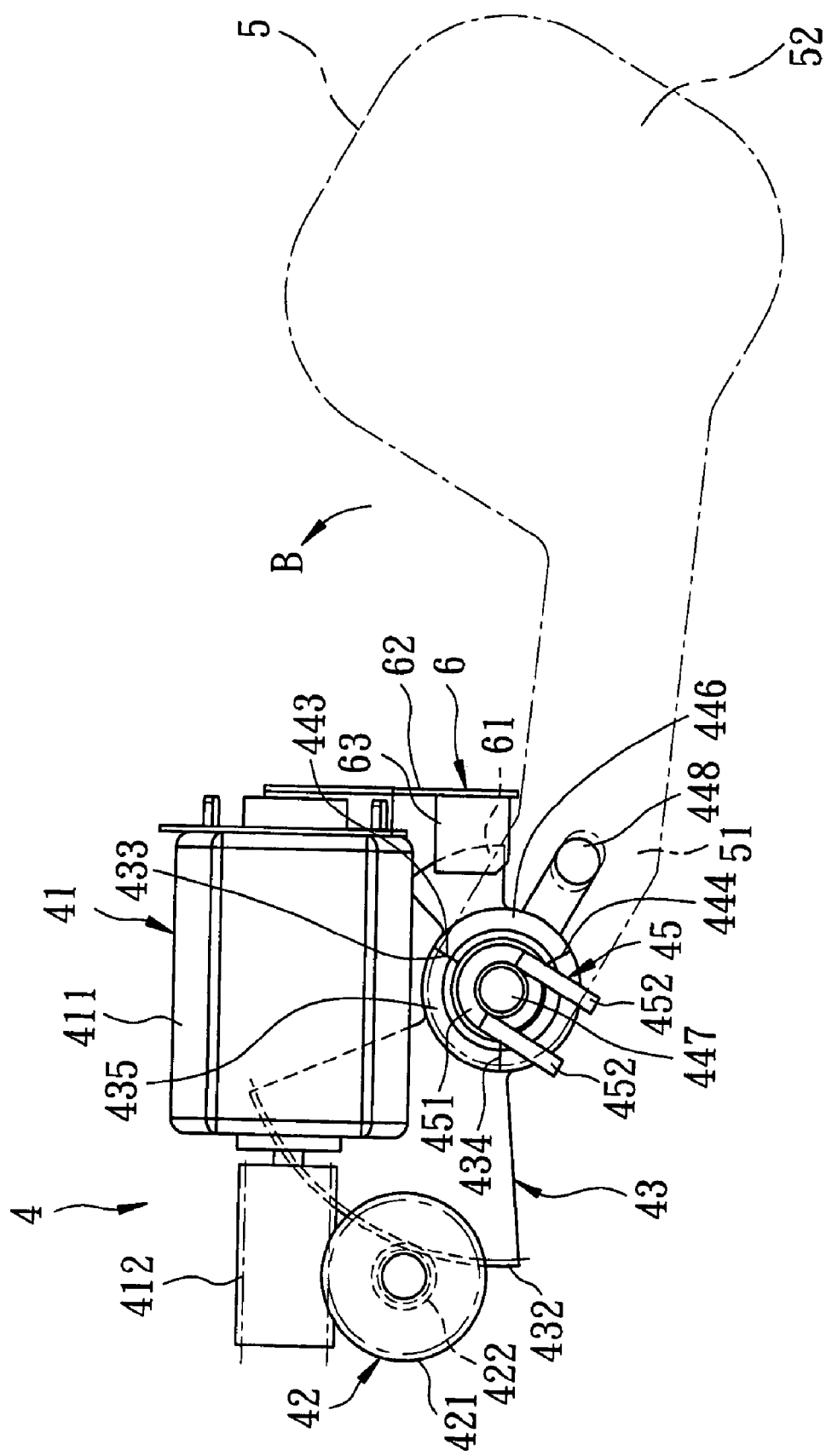
FIG. 5 is a fragmentary schematic side view of the preferred embodiment when a dust-proof plate is disposed in an open position.

With further reference to FIG. 5, the sum of the extension angles of the first curved wall 435 of the driving seat 43 and the second curved wall 446 of the driven seat 44 is smaller than 360 degrees. The overloading protecting member 45 is disposed between the first and second curved walls 435, 446, and abuts against the second pushing portion 434 and the second pushed portion 444.

The overloading protecting member 45 is configured as a torsion spring, and has a coiled portion 451 sleeved on the pivot rod unit 445 between the driving seat body 431 of the driving seat 43 and the base body 441 of the driven seat 44, and two end feet 452 extending from the coiled portion 451 and abutting respectively against the second pushing portion 434 and the second pushed portion 444. However, the overloading protecting member 45 is not limited to the torsion spring, as long as it has an appropriate resilient return force, and abuts against and is disposed between the second pushing portion 434 and the second pushed portion 444 such that it can deform when subject to an external force greater than a predetermined value.

Figure 7:
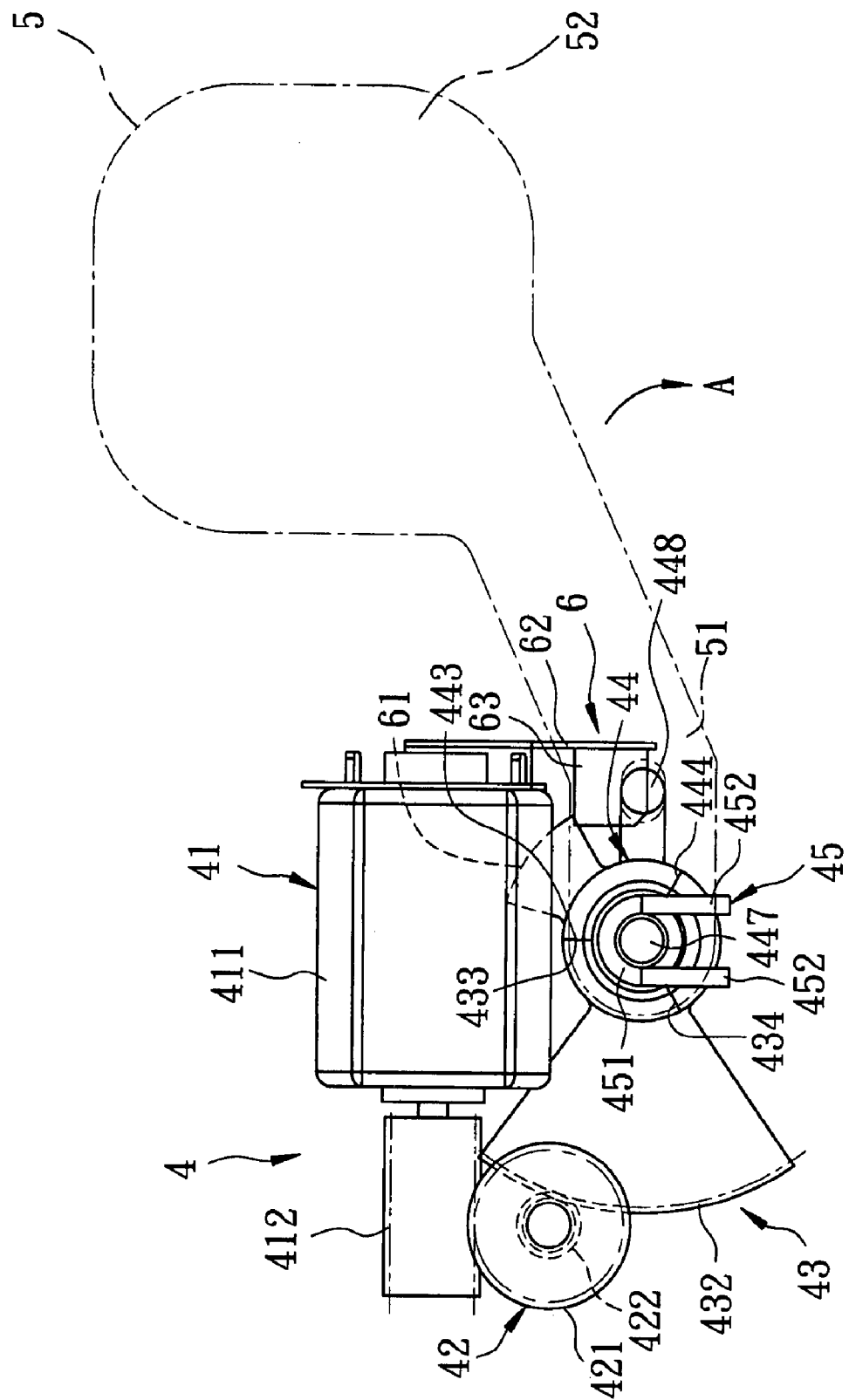
FIG. 7 is a view similar to FIG. 5 when the dust-proof plate is disposed in a close position.

The dust-proof plate 5 includes a connecting portion 51 connected to the output member 442 of the driven seat 44, and a covering portion 52 extending from the connecting portion 51 and co-movable with the connecting portion 51 between an open position shown in FIG. 5 and a close position shown in FIG. 7.

The output member 442 of the driven seat 44 includes a main rod portion 447 extending forwardly from the front rod portion 445' of the pivot rod unit 445 and disposed outwardly of the front wall 311, and an auxiliary rod portion 448 extending forwardly from the base body 441 toward the front wall 311 along a fourth axis (IV) parallel to the third axis (III). The main and auxiliary rod portions 447, 448 are connected fixedly to the connecting portion 51 of the dust-proof plate 5 so as to allow for co-rotation with the dust-proof plate 5 about the third axis (III).

The position-sensing unit 6 is disposed in the second accommodating chamber 315 in the base seat unit 3, and includes a light-shielding plate 61 extending radially and outwardly from the driving seat body 431, a mounting plate 62 disposed in proximity to an end of the motor 411 distal from the output shaft 411', and a sensor 63 disposed on the mounting plate 62 and aligned with the light-shielding plate 61.

With particular reference to FIG. 7, to open the dust-proof plate 5, the motor 411 is operated to rotate the output shaft 411' and, thus, the worm 412 about the first axis (I) in a first direction. Since the worm gear 421 and the first gear 422 of the drive unit 42 mesh respectively with the worm 412 and the second gear 432, rotation of the output shaft 411' is transferred to the driving seat 43. Hence, the first pushing portion 433 of the driving seat 43 pushes and rotates the first pushed portion 443 of the driven seat 44 and, thus, the driven seat 44 about the third axis (III). Further, due to the connection between the connecting portion 51 of the dust-proof plate 5 and the main and auxiliary rod portions 447, 448, the dust-proof plate 5 is rotated in a clockwise direction (A) to the open position. When the dust-proof plate 5 reaches the open position, the light-shielding plate 61 is aligned with the sensor 63, such that the sensor 63 emits a signal for stopping the motor 411 under control of a controller (not shown). As a result, the dust-proof plate 5 stays at the open position.

Subsequently, with particular reference to FIG. 5, to rotate the dust-proof plate 5 to the close position, the motor 411 is operated to rotate the output shaft 411' in a second direction opposite to the first direction. Rotation of the output shaft 411' is transferred to the driving seat 43 by the drive unit 42. Hence, the second pushing portion 434 pushes the corresponding end foot 452 of the overloading protecting member 45 and, thus, the overloading protecting member 45 so that the other end foot 452 pushes and rotates the second pushed portion 444 of the driven seat 44, thereby rotating the driven seat 44 and the dust-proof plate 5 in a counterclockwise direction (B). When the dust-proof plate 5 is rotated to the close position, the sensor 63 emits a signal in response to a change in the position of the light-shielding plate 61 to thereby stop the motor 411 under control of the controller.

Figure 6:
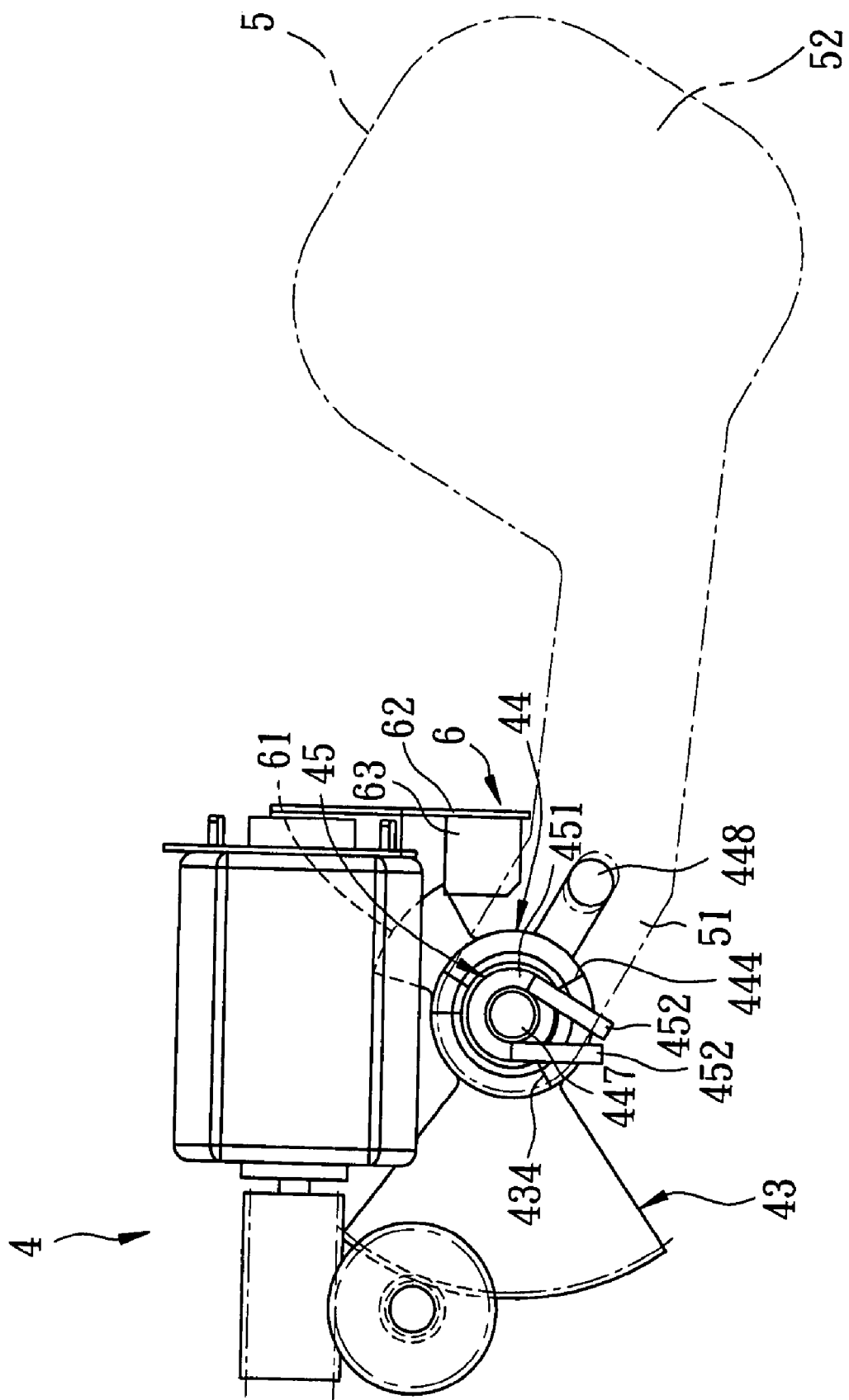
FIG. 6 is a view similar to FIG. 5, illustrating how an external force is applied to the dust-proof plate to deform an overloading protecting member.

With additional reference to FIG. 6, during rotation of the dust-proof plate 5 from the open position to the close position, if an external force is exerted on the dust-proof plate 5 to impede rotation of the dust-proof plate 5 toward the close position, the driving seat 43 will rotate relative to the driven seat 44. As such, the light-shielding plate 61 moves away from the sensor 63 to allow the sensor 63 to emit the signal for stopping the motor 411. In addition, the end feet 452 of the overloading protecting member 45 are pushed by the second pushing portion 434 and the second pushed portion 444 toward each other to store a resilient return force. When the external force is removed, the end feet 452 move away from each other to rotate the second pushed portion 444 to thereby rotate the dust-proof plate 5 to the close position.

The electric dust-proof device 2 of this invention has the following advantages:

1. Power is transmitted from the motor 411 to the dust-proof plate 5 by the drive unit 42, the driving seat 43, and the driven seat 44, which replace the large number of spur gears provided in the electric dust-proof device disclosed in U.S. Pat. No. 5,461,441. Since the number of the elements for power transmission is reduced significantly, the electric dust-proof device 2 can be assembled with ease and manufactured at a lower cost. Furthermore, the space occupied by the electric dust-proof device 2 is reduced.
2. Due to cooperation between the worm 412 and the worm gear 421, the speed reduction ratio is increased, as compared to a plurality of interconnected spur gears disclosed in U.S. Pat. No. 5,461,441.

It should be noted that, the overloading protecting member 45 is unnecessary, and alternatively, the second pushing portion 434 may abut directly against the second pushed portion 444.

With this invention thus explained, it is apparent that numerous modifications and variations can be made without departing from the scope and spirit of this invention. It is therefore intended that this invention be limited only as indicated by the appended claims.

We claim:
1. An electric dust-proof device comprising:
  a base seat unit;
  a driving mechanism including
    a power unit including a motor disposed on said base seat unit, and a worm driven by said motor to rotate in two directions,
    a drive unit including a worm gear disposed rotatably on said base seat unit and meshing with said worm, and a first gear driven by said worm gear,
    a driving seat including a driving seat body disposed pivotally on said base seat unit, and a second gear disposed on said driving seat body and meshing with said first gear, and a pair of spaced-apart first and second pushing portions disposed on said driving seat body, and
    a driven seat including a base body spaced apart from said driving seat body of said driving seat, an output member disposed on said base body, and a pair of spaced-apart first and second pushed portions disposed on said base body and corresponding respectively to said first and second pushing portions of said driving seat; and
  a dust-proof plate including a connecting portion connected to said output member of said driven seat, and a covering plate portion extending from said connecting portion and co-movable with said connecting portion between an open position and a close position.

2. The electric dust-proof device as claimed in claim 1, further comprising a position-sensing unit, which includes a light-shielding plate extending radially and outwardly from said driving seat body of said driving seat, and a sensor disposed on said base seat unit and aligned with said light-shielding plate.

3. The electric dust-proof device as claimed in claim 1, wherein said driving mechanism further includes a deformable overloading protecting member disposed between said driving seat and said driven seat and abutting against said second pushing portion of said driving seat and said second pushed portion of said driven seat.

4. The electric dust-proof device as claimed in claim 3, wherein said overloading protecting member is configured as a torsion spring, and has a coiled portion disposed between said driving seat body of said driving seat and said base body of said driven seat, and two end feet extending from said coiled portion and abutting respectively against said second pushing portion and said second pushed portion.

5. The electric dust-proof device as claimed in claim 1, wherein said output member of said driven seat has a main rod portion and an auxiliary rod portion parallel to each other and extending from said base body and connected fixedly to said connecting portion of said dust-proof plate.

6. The electric dust-proof device as claimed in claim 1, wherein said base seat unit includes:
  a main seat body having a pair of front and rear walls parallel to and spaced apart from each other, and a middle partition interconnecting middle portions of said front and rear walls so as to define a first accommodating chamber and a second accommodating chamber; and
  a cover plate for covering said rear wall of said main seat body.

7. The electric dust-proof device as claimed in claim 6, wherein said motor of said power unit includes an output shaft extending through said middle partition along a first axis, said worm and said motor being disposed respectively within said first and second accommodating chambers.

8. The electric dust-proof device as claimed in claim 7, wherein said drive unit is disposed in said first accommodating chamber, and further includes a pivot shaft having two ends disposed respectively and rotatably on said front wall of said main seat body and said cover plate, said worm gear and said first gear being sleeved fixedly on said pivot shaft and rotatable about a second axis perpendicular to said first axis.

9. The Electric dust-proof device as claimed in claim 8, wherein said driving seat body of said driving seat is disposed in said second accommodating chamber, and is rotatable about a third axis parallel to said second axis, said second gear being configured as a sector gear extending radially and outwardly from said driving seat body into said first accommodating chamber and meshing with said first gear of said drive unit, said driving seat further including a first curved wall projecting from said driving seat body toward said front wall and extending in a circumferential direction of said third axis, said first and second pushing portions being configured respectively as two opposite circumferential end surfaces of said first curved wall.

10. The electric dust-proof device as claimed in claim 9, wherein said base body of said driven seat is rotatable about said third axis, and is disposed in said second accommodating chamber, said driven seat further including a pivot rod unit having front and rear rod portions extending respectively from two opposite sides of said base body and disposed respectively and rotatably on said front wall and said cover plate, and a second curved wall extending from said base body toward said rear wall and extending in the circumferential direction of said third axis, said first and second pushed portions being configured respectively as two opposite circumferential end surfaces of said second curved wall, said driving seat body of said driving seat being formed with a pivot hole permitting rotation of said rear rod portion of said pivot rod unit therewithin so that said driving seat and said driven seat are rotatable about said pivot rod unit.

11. The electric dust-proof device as claimed in claim 10, wherein a sum of extension angles of said first curved wall of said driving seat and said second curved wall of said driven seat is smaller than 360 degrees, said driving mechanism further including an overloading protecting member disposed between said first and second curved walls and abutting against said second pushing portion and said second pushed portion.

12. The electric dust-proof device as claimed in claim 11, wherein said overloading protecting member is configured as a torsion spring, and has a coiled portion disposed between said driving seat body of said driving seat and said base body of said driven seat, and two end feet extending from said coiled portion and abutting respectively against said second pushing portion and said second pushed portion.

13. The electric dust-proof device as claimed in claim 10, wherein said front rod portion of said pivot rod unit ends within said front wall, said output member of said driven seat having a main rod portion and an auxiliary rod portion, said main rod portion extending forwardly from said front rod portion of said pivot rod unit and disposed outwardly of said front wall, said auxiliary rod portion extending forwardly from said base body toward said front wall along a fourth axis parallel to said third axis, said main rod portion and said auxiliary rod portion being connected fixedly to said connecting portion of said dust-proof plate so as to allow for co-rotation with said dust-proof plate about said third axis.

14. The electric dust-proof device as claimed in claim 9, further comprising a position-sensing unit disposed in said second accommodating chamber, said position-sensing unit including a light-shielding plate extending radially and outwardly from said driving seat body of said driving seat, a mounting plate disposed in proximity to an end of said motor distal from said output shaft, and a sensor disposed on said mounting plate and aligned with said light-shielding plate.

\* \* \* \* \*